(12) United States Patent
Schaupensteiner

(10) Patent No.: US 8,215,599 B2
(45) Date of Patent: Jul. 10, 2012

(54) FASTENING DEVICE

(75) Inventor: Walter Schaupensteiner, Rutesheim (DE)

(73) Assignee: Dr. Ing. h.c.f. Porsche AG (DE)

( * ) Notice: Subject to any disclaimer, the term of this patent is extended or adjusted under 35 U.S.C. 154(b) by 363 days.

(21) Appl. No.: 12/354,287

(22) Filed: Jan. 15, 2009

(65) Prior Publication Data
US 2009/0184532 A1  Jul. 23, 2009

(30) Foreign Application Priority Data

Jan. 18, 2008 (DE) .......................... 10 2008 004 937

(51) Int. Cl.
*A47B 96/00* (2006.01)

(52) U.S. Cl. .............. 248/221.11; 248/222.11; 361/725; 361/726

(58) Field of Classification Search ................. 248/27.1, 248/27.3, 221.11, 222.11, 222.12, 225.21; 312/223.2, 223.1, 333, 319.1; 361/609, 679.38, 361/679.39, 725, 726, 727, 732
See application file for complete search history.

(56) References Cited

U.S. PATENT DOCUMENTS

| | | | | |
|---|---|---|---|---|
| 2,028,954 A * | 1/1936 | Roedding | ..................... | 292/126 |
| 2,197,195 A * | 4/1940 | Schemers | ..................... | 292/128 |
| 4,947,661 A * | 8/1990 | Yoshida | ............................. | 70/57 |
| 4,979,909 A * | 12/1990 | Andrews | ....................... | 439/352 |
| 5,152,496 A * | 10/1992 | Kobayashi | ................... | 248/551 |
| 5,779,197 A * | 7/1998 | Kim | ............................. | 248/27.1 |
| 6,123,314 A * | 9/2000 | Steele | ........................... | 248/681 |
| 6,357,803 B1 * | 3/2002 | Lorek | .............................. | 292/99 |
| 6,404,641 B1 * | 6/2002 | Fisk et al. | ...................... | 361/727 |
| 6,611,424 B2 * | 8/2003 | Huang | ...................... | 361/679.39 |
| 6,614,654 B2 * | 9/2003 | Chen et al. | ............... | 361/679.33 |
| 6,616,106 B1 * | 9/2003 | Dean et al. | .................... | 248/27.1 |
| 6,795,309 B2 * | 9/2004 | Hartung et al. | ............ | 361/679.4 |
| 6,999,307 B2 * | 2/2006 | Peng | ......................... | 361/679.37 |
| 7,036,783 B2 * | 5/2006 | Chen et al. | ................. | 248/298.1 |
| 7,382,623 B2 * | 6/2008 | Hartman | ....................... | 361/726 |
| 2005/0029409 A1 * | 2/2005 | Tagle | ........................... | 248/27.1 |
| 2005/0286163 A1 * | 12/2005 | Kim et al. | ................... | 360/97.02 |
| 2011/0051356 A1 * | 3/2011 | Yang et al. | ............... | 361/679.39 |

FOREIGN PATENT DOCUMENTS

| | | |
|---|---|---|
| DE | 2903176 A1 | 7/1980 |
| DE | 3341170 A1 | 5/1984 |
| DE | 8804966.3 U1 | 7/1988 |
| DE | 3831317 C1 | 3/1990 |
| DE | 4334193 A1 | 4/1995 |
| DE | 19614781 C2 | 8/1999 |
| DE | 20307482 U1 | 10/2003 |
| DE | 102006032462 A1 | 1/2008 |

* cited by examiner

*Primary Examiner* — A. Joseph Wujciak, III
(74) *Attorney, Agent, or Firm* — Gerald E. Hespos; Michael J. Porco

(57) ABSTRACT

A fastening device for securing an appliance within a receiving frame in the interior of a motor vehicle. The receiving frame has a built-in opening into which the appliance can be introduced on an introductory plane along an installation direction and is locked releasably in an end position in the receiving frame. The fastening device has at least one latching hook. The latching hook is movable in the direction of a surface normal of the introductory plane and, in an end position, engages behind at least one retaining device such that the appliance is locked in the end position in the receiving frame against a movement counter to the installation direction.

5 Claims, 3 Drawing Sheets

FASTENING DEVICE

CROSS-REFERENCE TO RELATED APPLICATION

This application claims the priority, under 35 U.S.C. §119, of German application DE 10 2008 004 937.9, filed Jan. 18, 2008; the prior application is herewith incorporated by reference in its entirety.

BACKGROUND OF THE INVENTION

Field of the Invention

The invention relates to a fastening device for securing an appliance within a receiving frame in the interior of a motor vehicle. The receiving frame has a built-in opening into which the appliance can be introduced on an introductory plane along an installation direction, and the appliance is locked releasably in an end position in the receiving frame.

A fastening device of this type is known. The appliance is, for example, an information appliance and/or an entertainment appliance. The appliance is pushed into the receiving frame and secured in the end position by screw connections. It is thereby ensured that, during acceleration and/or during braking of the motor vehicle, in particular in the event of a crash, the appliance remains in the mounted end position in the receiving frame and occupants are not put at risk by the appliance sliding out.

However, it has proven disadvantageous that a covering of the receiving frame has to be removed for removal of the appliance in order to provide access to the screw connections. The appliance has to be removed, for example, in the event of a defect for exchange or repair. This makes the removal or fitting of the appliance very awkward and time-consuming.

German utility model DE 203 07 482 U1 shows a fastening device, which is not of the type in question, for an information appliance and/or entertainment appliance, such as a navigation system, a DVD player, multimedia players, games consoles, laptops or the like. The appliance can be inserted horizontally into a covering device and is secured there by a clip which can be placed over it. The covering device is accommodated as a whole in the center console of a motor vehicle and has a support unit and a locking unit. The locking unit receives the appliance. The support unit carries the locking unit and can be extended from a receiving frame in the manner of a telescope and, in the extended state, can be locked in a choice of one of a plurality of end positions. For the locking, use is made of a spring-prestressed rotational element which latches into latching grooves on the receiving frame. The appliance which is retained by the clip is not located within the receiving frame. The same applies both to the extended state and to the pushed-in state.

SUMMARY OF THE INVENTION

It is accordingly an object of the invention to provide a fastening device that overcomes the above-mentioned disadvantages of the prior art devices of this general type, in which the installation and removal of an appliance within the receiving frame are simplified.

With the foregoing and other objects in view there is provided, in accordance with the invention, a fastening device for securing an appliance within a receiving frame in an interior of a motor vehicle. The receiving frame has a built-in opening formed therein into which the appliance can be introduced on an introductory plane along an installation direction, and the appliance is locked releasably in an end position in the receiving frame. The fastening device contains at least one retaining device; and at least one latching hook being movable in a direction of a surface normal of the introductory plane. In an end position, the latching hook engages behind the at least one retaining device such that the appliance is locked in the end position in the receiving frame against a movement counter to the installation direction.

A fastening device of this type has at least one latching hook which is movable in the normal direction of the introductory plane and which, in the end position, engages behind at least one retaining device such that the appliance is locked in the end position in the receiving frame against a movement counter to the installation direction.

In this case, a movement in the normal direction of the introductory plane is understood as meaning any movement which has a component in the normal direction.

Owing to the fact that the latching hook is movable in the normal direction with respect to the introductory plane, it moves in particular parallel to a side wall of the receiving frame, which reduces a tendency of the latching hook and side wall to become jammed.

It is advantageous that the receiving frame no longer has to be accessible from the outside. It is therefore possible to mount the appliance in the receiving frame without having to remove a lining of the receiving frame.

The introductory plane can be oriented vertically, horizontally or in any desired angular position between said extremes. However, fitting positions are preferred in which a horizontal component of the introductory plane is greater than a vertical component of the introductory plane.

The at least one latching hook is preferably arranged on the appliance and the retaining device is preferably arranged in the receiving frame.

In an alternative arrangement, the at least one latching hook is arranged in the receiving frame and the retaining device is arranged on the appliance.

In a preferred exemplary embodiment, the retaining device is formed by a projection. In this case, the projection may contain a single piece together with the receiving frame or may be formed from a separate part which is fixedly connected to the receiving frame. The projection is preferably a bolt, the cylindrical body of which is engaged behind by the latching hook.

In a further exemplary embodiment, it is provided that the retaining device is formed by a cutout. For example, the retaining frame has an opening for the latching hook, which opening defines an end position, for example a stop for the latching hook.

A combination of projection and cutout is also conceivable. The latching hook is preferably constructed in the manner of a harpoon, with the harpoon tip pointing in the installation direction. In this case, the latching hook has a side edge which is inclined in relation to the installation direction and which interacts with the retaining device in such a manner that the latching hook, when introduced in the installation direction, is pressed by the retaining device in the normal direction of the introductory plane.

In a further development of the last-mentioned exemplary embodiment, the latching hook is prestressed transversely with respect to the receiving direction by a spring element. The effect achieved by this is that the latching hook, after overcoming the retaining device, is moved back into a basic position and engages behind the retaining device. It is advantageous here for the appliance, when pushed into the receiving frame, to automatically latch without additional manual interventions.

As an alternative thereto, an exemplary embodiment is proposed in which the latching hook is moved manually into an end position.

Furthermore, an exemplary embodiment is preferred, in which two parallel latching hooks latch with the projection by a translatory movement. The latching hooks are therefore displaced in a translatory movement in the normal direction of the introductory plane and latch with the projection likewise by a translatory movement. In this case, it can be provided in particular that the latching hooks are guided in a guide rail, with the spring element being fastened to the latching hook at one end and to the guide rail at the other end. An advantage if two parallel latching hooks are used is that only small tilting forces, if any at all, are exerted on the appliance during installation. This reduces the risk of the appliance becoming jammed during installation.

In a further development, it is provided that, in the end position, the latching hook bears against the retaining device with an edge, which is beveled with respect to the installation direction, such that the appliance is pushed or pulled in the installation direction by the spring-loaded latching hook. The effect achieved by this is that the spring element, even when already latched in place, still exerts a force, which is directed toward an end stop, on the appliance. This affords the advantage of reduced play between the latched-in appliance and the receiving frame.

As an alternative thereto, a further refinement provides two latching hooks which latch in a rotatory manner with the projection.

A further variant provides that the latching hook has a manually actuable fixing and release lever. In this case, the lever is preferably configured in such a manner that it extends counter to the installation direction and, when the appliance is mounted in the retaining frame, can be actuated by a user.

In a further exemplary embodiment, it is provided that the receiving frame has a first guide device which interacts with a second guide device of the appliance when the appliance is placed into the receiving frame. The first guide device of the receiving frame can be formed here, for example, by grooves which interact in a guiding manner with projections of the appliance. The first and second guide devices are preferably arranged in such a manner that they define the introductory plane.

Finally, an exemplary embodiment is proposed in which the receiving frame is composed of a diecast aluminum part. As an alternative, diecast magnesium is also possible.

Other features which are considered as characteristic for the invention are set forth in the appended claims.

Although the invention is illustrated and described herein as embodied in a fastening device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
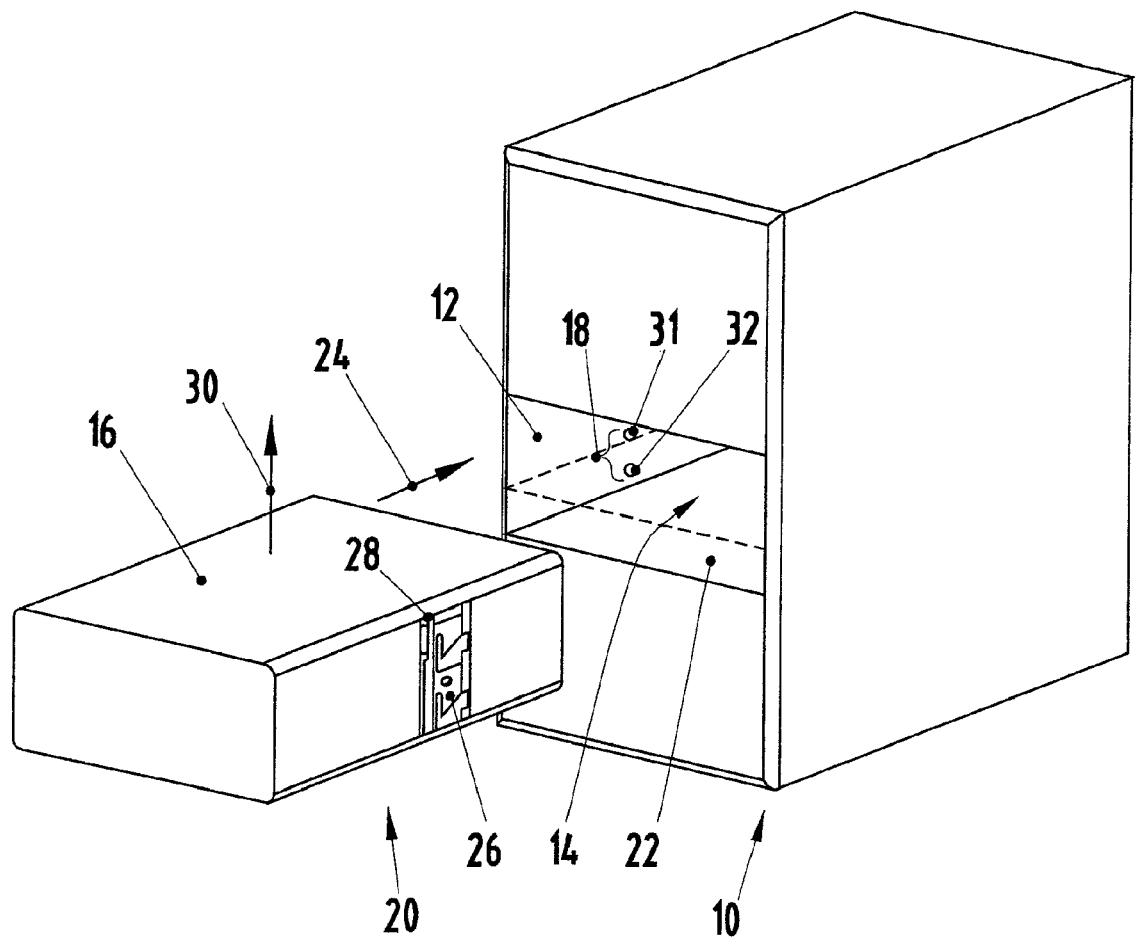
FIG. 1 is a diagrammatic, perspective view of fastening device on an appliance according to the invention.

Referring now to the figures of the drawing in detail and first, particularly, to FIG. 1 thereof, there is shown a center console 10 of a motor vehicle interior. The center console 10 has a receiving frame 12 with a standardized built-in opening 14. The receiving frame 12 serves to receive and secure an appliance 16 of the type mentioned at the beginning, i.e., for example, to receive a navigation appliance. In a preferred refinement, the receiving frame 12 is a diecast magnesium part and has a retaining device 18 which, upon installation, interacts with a fastening device 20 on the appliance 16. As an alternative to the illustration of FIG. 1, the fastening device 20 can also be integrated in the receiving frame 12. In this case, the retaining device 18 would be provided on the appliance 16.

During installation, the appliance 16 is introduced on an introductory plane 22 along an installation direction 24 into the receiving frame 12 where it latches into place by interaction of the retaining device 18 with the fastening device 20. In the mounted state, the appliance 16 is therefore secured or locked releasably in the receiving frame 12.

For the latching, the fastening device 20 has a latching hook 26 which is guided in an elastically movable manner in a guide frame 28 of the fastening device 20. In a preferred refinement, the guide frame 28 permits movement of the latching hook 26, the movement taking place substantially parallel to a surface normal 30 of the introductory plane 22. In the refinement illustrated in FIG. 1, the retaining device 18 is realized as bolts 31, 32.

The latching hook 26 preferably has a harpoon shape, with the harpoon tip pointing in the installation direction 24. In this case, the latching hook 26 has a side edge which is inclined in relation to the installation direction 24 and which interacts with the retaining device 18 in such a manner that the latching hook 26, when introduced in the installation direction 24, is pressed by the retaining device 18 in the normal direction 30 of the introductory plane 22.

The latching takes place by, when the appliance 16 is introduced into the receiving frame 12, the latching hook 26 being initially raised by the bolts 31, 32, sliding over the bolts 31, 32 and then being moved elastically into a position in which it engages behind the bolts 31, 32 of the retaining device 18 such that the appliance 16 is locked in the end position in the receiving frame 12 against a movement counter to the installation direction 24.

In one refinement, the receiving frame 12 has a first guide device, for example edges, rails or grooves, which interact with a second guide device, which is in each case complementary thereto, of the appliance 16 when the appliance 16 is placed into the receiving frame 12.

Figures 2A, 2B, 2C:
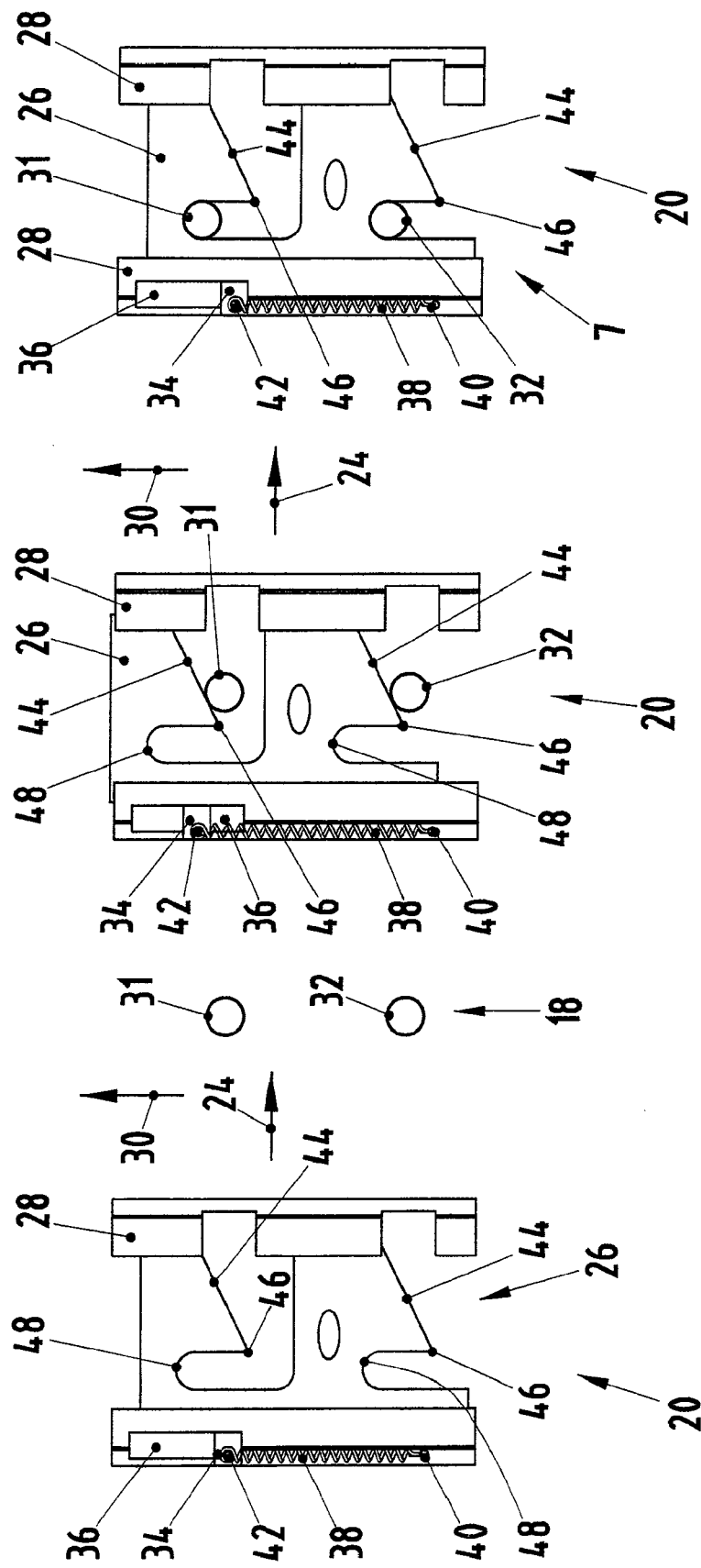
FIGS. 2A-2C are diagrammatic, top views of the fastening device in various installation phases, with a first refinement of a latching hook.

FIGS. 2A-2C show a top view of the fastening device 20 and of the retaining device 18 in various installation phases, with a first refinement of the latching hook 26. The latching hook 26 of the fastening device 20 has a lug 34 which is guided in an elastically movable manner in the direction 30 by an elongate opening 36 in the guide frame 28. In this case, the elastic resetting forces are produced by a spring element 38 which is attached to the guide frame 28 at a first end 40 and to the latching hook 26, in particular to the lug 34, at another end 42.

FIG. 2A shows the relative position of the fastening device 20 and the retaining device 18 when the appliance 20 is pushed into the built-in opening 14. In this case, the retaining device 18 initially still do not have any contact with the latching hook 26. In the direction 30, the latching hook 26 is in a non-deflected basic position. FIG. 2B shows the situation shortly before the end position of the appliance 20 in the receiving frame 12 is reached. The inclined, first sides 44 of the latching hook 26 make contact with the bolts 31, 32.

By further pushing-in of the appliance 16 along the installation direction 24, the elastically movable latching hook 26 yields in the direction 30 in relation to the positionally fixed bolts 31, 32 as a consequence of the force acting in the installation direction 24 and of a resolving of forces at the contact point of the bolts 31, 32 and the inclined, first sides 44. In this case, the spring element 38 is expanded in the direction 30 counter to the unloaded inoperative position. When the edges 46 slide over the bolts 31, 32, the latching hook 26 is guided counter to the direction 30 by the spring force of the spring element 38 into a latching position in which it engages behind the bolts 31, 32 by cutouts 48. This latching position is illustrated in FIG. 2C.

When the appliance 16 is removed from the receiving frame 12, the latching hook 26 is deflected in the direction 30 by a suitable tool such that the bolts 31, 32 are no longer engaged behind by cutouts 48, and the appliance 16 can be pulled out of the receiving frame 12 counter to the installation direction 24.

In the refinement illustrated in FIGS. 2A-2C, the latching hook 26 has two inclined sides 44 and two cutouts 48 which form the engaging-behind means together with two bolts 31, 32 which are arranged one above the other in the receiving frame 12.

Figure 3:
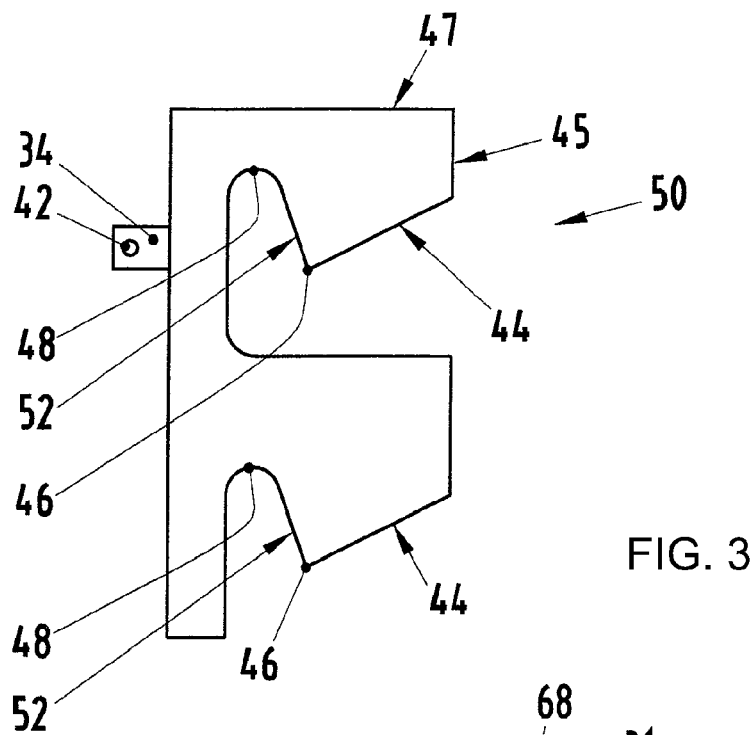
FIG. 3 is an illustration of a second refinement of the latching hook of the fastening device.

FIG. 3 shows a second refinement 50 of the latching hook. The latching hook 50 according to FIG. 3 differs from the latching hook 26 of FIG. 2 by means of two inclined second sides 52 which, as seen in the installation direction 24, adjoin the edges 46. Otherwise, the same reference numbers represent the same elements in all of the figures, and therefore reference is made to the description of FIGS. 2A-2C for the explanation of the other features of the latching hook 50. The harpoon shape already mentioned arises if the edge 45 is replaced by a tip. In this application, the shape, which is illustrated in FIG. 3, with the edges/sides 52, 46, 44, 45, 47 is meant by the harpoon shape.

By means of the inclined second sides 52 and the spring force of the spring element 38, the appliance 16 is also pulled or pushed further into an end position by the latching hook 50 when the edges 46 have slid beyond the bolts 31, 32. This reduces the play of the appliance 16 in the receiving frame 12 in the installation direction 24, which constitutes a substantial advantage in particular in terms of reducing noise.

Figure 4:
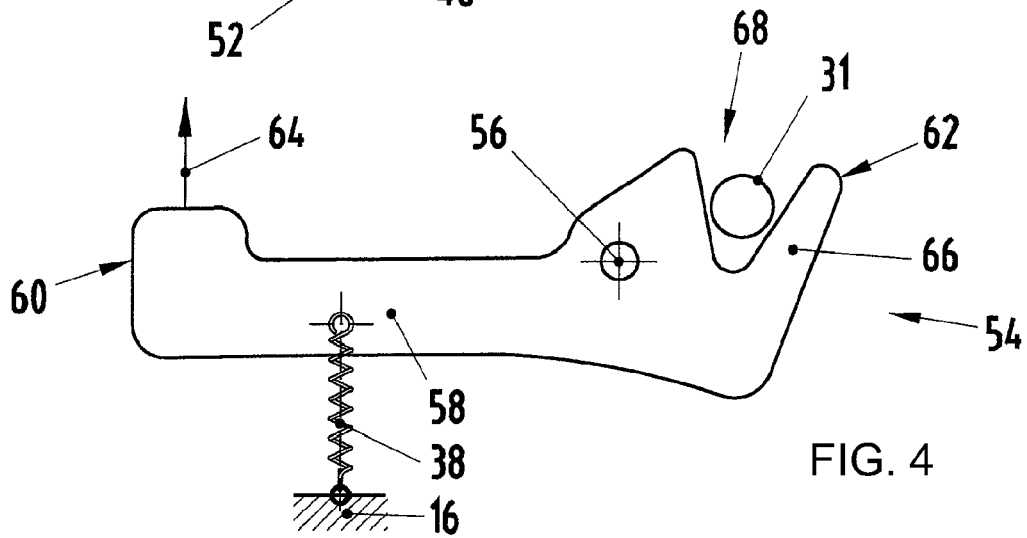
FIG. 4 is an illustration of a third refinement of the latching hook of the fastening device.

FIG. 4 shows a third refinement 54 of the latching hook of the fastening device. Unlike the latching hooks 26 and 50 described up to now, the latching hook 54 of FIG. 4 is not displaceable in a translatory manner in the direction 30, but rather is mounted rotatably at a pivot point 56. The latching hook 54 furthermore has a lever 58 which is set up by means of its length, orientation and dimensioning in order to be actuated manually. When the appliance 16 is introduced into the receiving frame 12, the end 60 of the latching hook 54 points in a direction which is substantially opposed to the installation direction 24. For the installation, the latching hook 54 is rotated in such a manner that its edge 62 slides past one of the bolts 31, 32 when the appliance 16 is introduced into the receiving frame 12. In the illustration of FIG. 4, the latching hook 54 is deflected for this purpose in the direction of the arrow 64. After having slid past, the latching hook is rotated manually by the lever 58 counter to the direction 64 into the position shown, in which it engages by a leg 66 behind the bolt 31 and thereby locks the appliance 16 in the receiving frame 12.

In the refinement of FIG. 4, that part of the latching hook 54 which is located to the right of the pivot point 56 is heavier than the part located to the left of the pivot point 56, and therefore the illustrated position of the latching hook 54 is stable. In addition, the mouth 68 of the latching hook can be made elastic and matched in its shape to the bolt 31 in such a manner that, when the latching hook 54 rotates into the illustrated position, an elastic interlocking connection is produced, in which the bolt 31 latches into the mouth 68. As an alternative or in addition, a spring 38 can be fitted to the latching hook 54, the other end of which spring is attached to the appliance 16 in a fixed position and which generates elastic resetting forces when the latching hook 54 is deflected from the illustrated position.

Figure 5:
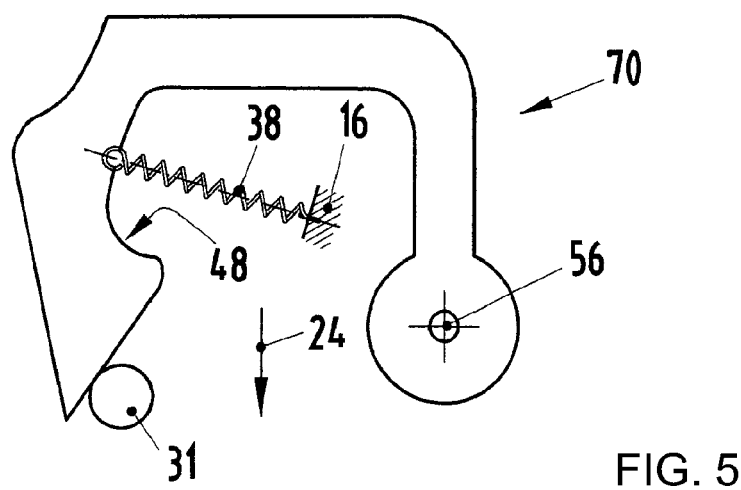
FIG. 5 is an illustration of a fourth refinement of the latching hook of the fastening device.

FIG. 5 shows a fourth refinement 70 of the latching hook of the fastening device 20, which latching hook likewise is not displaceable in a translatory manner in the direction 30, but rather is mounted rotatably at a pivot point 56. In this case, the spring element 38 is fastened at one end to the latching hook 70 and at the other end to the appliance 16, thus resulting in prestressing between the latching hook 70 and the appliance 16. When the appliance 16 is pushed into the receiving frame 12, with the pushing-in taking place in the installation direction 14, the latching hook 70 in this refinement does not yield in a translatory manner, but rather rotates about the pivot point 56.

After the edge 46 has slid beyond the bolt 31 in the direction 24, the latching hook 70 is rotated back into its inoperative position by the spring force of the spring element 38 and, in the process, engages by its cutout 48 behind the bolt 31. In a similar manner as in the refinement of FIG. 3, a resulting force is also produced here in the latched-in state, the force pulling or pressing the appliance 16 further into its end position.

The invention claimed is:

1. A fastening device for securing an appliance within a receiving frame in an interior of a motor vehicle, the receiving frame having a built-in opening formed therein into which the appliance can be introduced on a horizontal introductory plane along an installation direction, and the appliance being locked releasably in an end position in the receiving frame, the fastening device comprising:

at least one retaining device formed by at least one projection and mounted on the receiving frame:

at least one latching hook mounted on the appliance and being movable in a direction of a surface normal of the introductory plane being a vertical direction and, in an end position, said latching hook engaging behind said at least one retaining device such that the appliance is locked in the end position in the receiving frame against a movement counter to the installation direction, said at least one latching hook having at least one cutout formed therein, said latching hook having two parallel latching hooks latching with said projection by means of a translatory movement; and a spring element, said latching hook is prestressed transversely with respect to the installation direction by said spring element.

2. The fastening device according to claim 1, wherein said latching hook is set up for manual actuation.

3. The fastening device according to claim 1, wherein said latching hook has an edge, and in the end position, said latching hook bears against said retaining device with said edge, which is beveled with respect to the installation direction, such that the appliance is pulled or pushed in the installation direction.

4. The fastening device according to claim 1, further comprising a manually actuable lever.

5. A fastening device for securing an appliance within a receiving frame in an interior of a motor vehicle, the receiving frame having a built-in opening formed therein into which the appliance can be introduced on an introductory plane along an installation direction, and the appliance being locked releasably in an end position in the receiving frame, the fastening device comprising:

at least one retaining device mounted on the receiving frame and having a projection: and two latching hooks mounted on the appliance and being movable in a direction of a surface normal of the introductory plane and, in an end position, said latching hooks engaging behind said at least one retaining device such that the appliance is locked in the end position in the receiving frame against a movement counter to the installation direction, said two latching hooks latching in a rotatory manner with said projection, and at least one latching of said hooks has at least one cutout formed therein.

* * * * *